(12) United States Patent
Akashi et al.

(10) Patent No.: US 6,579,596 B1
(45) Date of Patent: *Jun. 17, 2003

(54) COMPOSITE MATERIAL AND PROCESS FOR PRODUCTION THEREOF

(75) Inventors: Ryojiro Akashi, Minami-Ashigara (JP); Akinori Komura, Minami-Ashigara (JP); Takashi Uematsu, Minami-Ashigara (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,357

(22) Filed: Apr. 10, 1998

(30) Foreign Application Priority Data

Apr. 15, 1997 (JP) .............................. 9-097633
Nov. 19, 1997 (JP) .............................. 9-317854

(51) Int. Cl.[7] .......................... B32B 27/28; B32B 3/00
(52) U.S. Cl. ...................... 428/195; 428/500; 428/523; 427/301; 427/385.5; 525/50; 525/70
(58) Field of Search ................. 428/195, 375, 428/378, 403, 407, 411.1, 500, 523; 427/385.5, 299, 301; 525/50, 70

(56) References Cited

U.S. PATENT DOCUMENTS

| | | | | |
|---|---|---|---|---|
| 4,661,383 A | * | 4/1987 | Elsenbaumer et al. | 427/302 |
| 5,407,728 A | * | 4/1995 | Kerr et al. | 428/195 |
| 5,500,253 A | * | 3/1996 | Sanduja et al. | 427/385.5 |
| 5,621,018 A | * | 4/1997 | Chabrecek et al. | 522/35 |
| 5,674,947 A | * | 10/1997 | Oishi et al. | 525/289 |

FOREIGN PATENT DOCUMENTS

| | | | |
|---|---|---|---|
| JP | 60-58415 A | * | 4/1985 |
| JP | B2-62-7931 | | 2/1987 |
| JP | 55-13728 B2 | * | 2/1987 |
| JP | 5-5845 B2 | * | 1/1993 |
| JP | B-5-5845 | | 1/1993 |
| JP | A-6-287243 | | 10/1994 |

OTHER PUBLICATIONS

Krassig, H. et al., *Graft Co–Polymerization to Cellulose and its Derivatives*, Adv. Polymers Sci., vol. 4, pp. 111–156 (1965).

(List continued on next page.)

*Primary Examiner*—Cynthia H. Kelly
*Assistant Examiner*—Dawn Garrett
(74) *Attorney, Agent, or Firm*—Oliff & Berridge, PLC

(57) ABSTRACT

Disclosed are a composite material comprising a substrate having a three-dimensional structure which has, on substantially entire surface thereof, regions where a polymerizable unsaturated compound is graft-bonded and regions where the polymerizable unsaturated compound is not graft-bonded, a method for graft polymerization comprising the steps of reacting the surface of the substrate having a three-dimensional structure with droplets of a solution containing a graft polymerization initiator in a suspension or an emulsion comprising the solution containing a graft polymerization initiator and a solvent immiscible with the solution containing the graft polymerization initiator so as to form polymerization initiating regions on the surface of the substrate and thereafter graft-polymerizing a polymerizable unsaturated compound to the surface part where the polymerization initiating regions are formed, and a composite material comprising a substrate which has, on substantially entire surface thereof, regions where a polymerizable unsaturated compound is graft-bonded and regions where the polymerizable unsaturated compound is not graft-bonded.

67 Claims, 5 Drawing Sheets

OTHER PUBLICATIONS

Brockway, C., *Copolymerization of Methyl Methacrylate with Unsaturated Esters of Granular Starch*, Journal of Polymer Science: Part A, vol. 3, pp. 1031–1036 (1965).

O'Driscoll, K., *Solvent Effects in Anionic Copolymerization*, Journal of Polymer Science: Part A, vol. 3, pp. 1037–1044 (1965).

McDowall et al., *The Ceric Ion Method of Grafting Acrylic Acid to Cellulose*, American Chemical Society Symp. Ser., 87, pp. 45–55 (1982).

Matsuda, T. et al., *Ceric–Ion–Initiating Surface Graft Polymerization with Regional Control and Dimensional Precision*, Macromolecules 29, pp. 7446–7451 (1996).

Matsuda et al., "Ceric–Ion–Initiating Surface Graft Polymerization with Regional Control and Dimensional Precision", Macromolecules, V 29, No. 23, pp. 7446–7451, 1996.*

* cited by examiner

NON-GRAFTED REGION ON THE SURFACE OF A SUBSTRATE,
DOMAINS MADE UP OF GRAFT POLYMERS

GRAFT POLYMERS A

GRAFT POLYMERS B

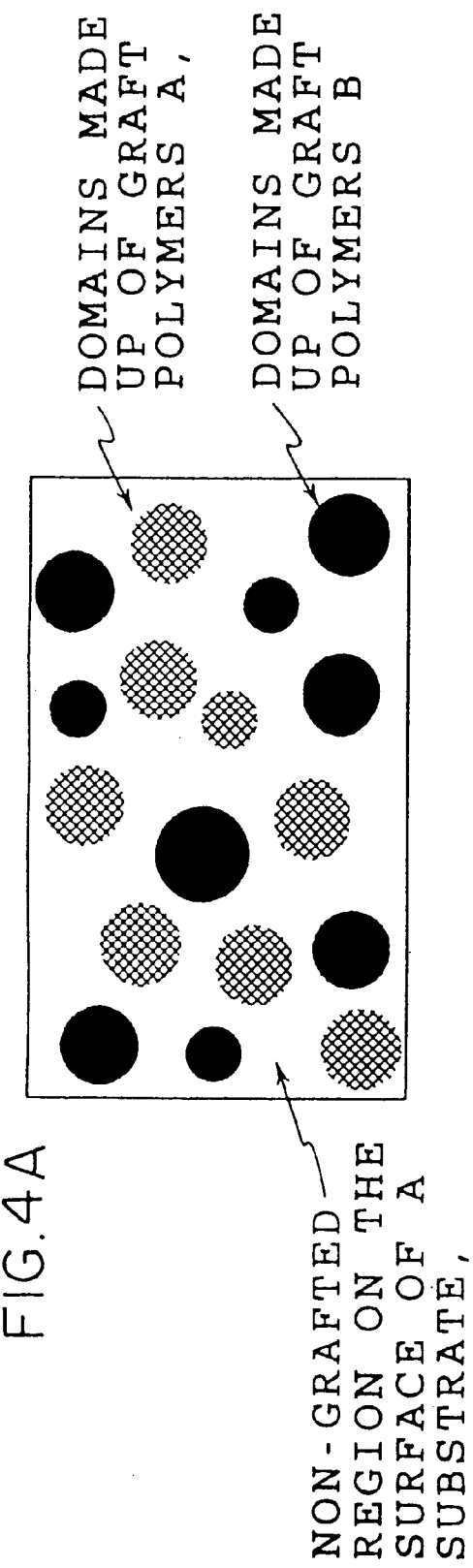
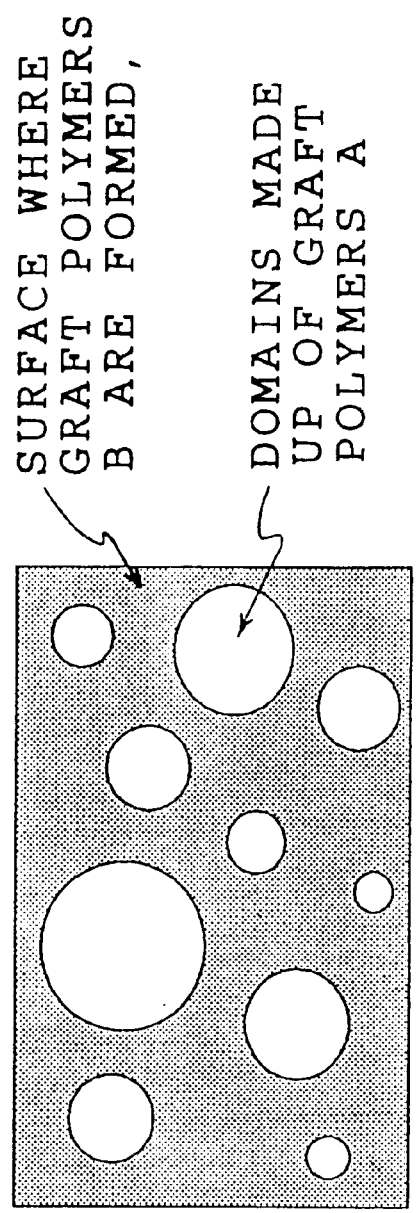
FIG.4A
FIG.4B

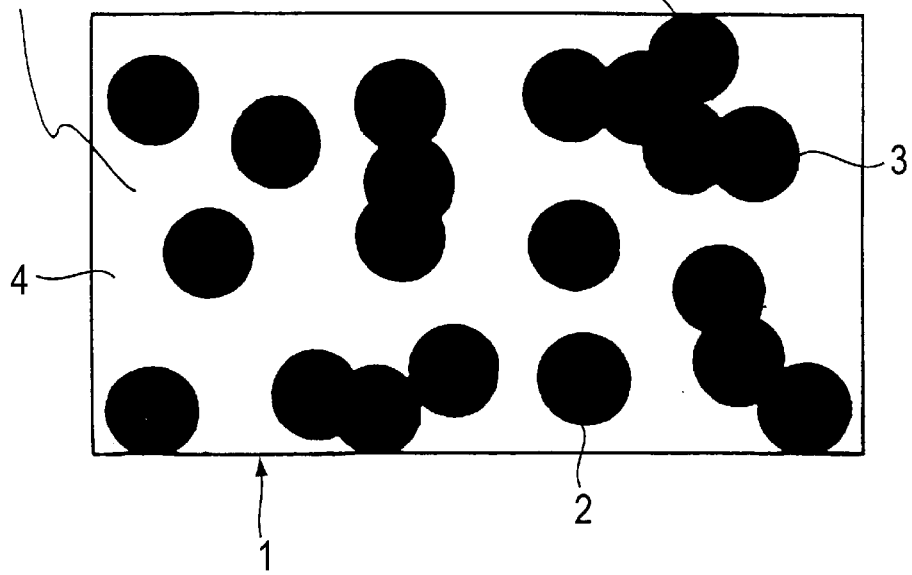

COMPOSITE MATERIAL AND PROCESS FOR PRODUCTION THEREOF

BACKGROUND OF THE INVENTION

1. Field of the Invention

The present invention relates to a composite material and to a method for producing it. Specifically, the present invention relates to a composite material produced by forming graft polymers nonuniformly on a substrate and also to a method for producing this composite material. More specifically, the present invention relates to a biodegradable composite material capable of exhibiting an excellent biodegradability together with other functions and also to a method for producing this biodegradable composite material.

2. Description of the Related Art

Because of the disposal problems of discarded goods such as synthetic plastics, a biodegradable resin, which is degraded by the action of microorganisms in soil, is drawing attention. Presently, known biodegradable resins include aliphatic polyesters and the like which are prepared by a chemical synthesis or a biosynthesis, resins utilizing naturally occurring polymers such as starch, cellulose, and the like, and chemically synthesized polymers such as polyvinyl alcohol, polyether, and the like. These materials are described in, e.g., Yoshiharu Doi, "Biodegradable Polymeric Materials" (Kogyo Chosakai Publishing Co., Ltd.).

Despite remarkable progress in biodegradable resin technologies, the use of biodegradable resins centers on wrappers and containers which are discarded after a single use, and the amount of use the biodegradable resins is also restricted by their high cost. Henceforth, biodegradable resins will expand their field of application as a highly functional material in addition to the wrappers and containers now in use. However, conventional biodegradable resins are mostly developed from the standpoint of degradability and, hence, the restrictions imposed on designing retard the development of biodegradable resins as functional materials.

Meanwhile, materials, which effectively utilize naturally occurring polymeric materials, are highlighted because of problems such as the depletion of petroleum resources and the release of $CO_2$ into atmosphere and, hence, one of the contemplated applications of naturally occurring resins is their use as a biodegradable resin. However, the attempt to impart functions to the naturally occurring polymeric materials is associated with problems. For example, one of the problems is that chemical modification impairs the excellent biodegradability inherent in the naturally occurring polymeric materials. Another problem is that it is difficult to obtain materials having a high level of functions comparable to those of synthetic polymers by a mere chemical modification of the substituent groups of the naturally occurring polymeric materials. As an embodiment of a naturally occurring polymeric material rendered more highly functional, a material which comprises a naturally occurring polymeric material having grafted thereto other polymeric material has been developed (J. Fibers and Textiles Soc. Japan, 102, Vol. 47, No.2, 1991). However, little is reported of the studies about the biodegradability of such a material.

A variety of graft polymerization methods are known as an effective means for modifying a material or a material surface. Examples of these methods include (1) a method wherein active sites are created either inside a material or on the surface of the material by utilizing the reaction between either radioactive rays, a redox initiator, or an ion-based initiator and the material or by utilizing the chain transfer of a radical initiator and thereafter a polymerizable unsaturated compound (hereinafter referred to as "a polymerizable monomer" on occasion) is polymerized by the active sites (described in, e.g., Adv. Polym. Sci., Vol. 4, p.111, 1965), (2) a method wherein polymerizable unsaturated bonds are introduced into a material and a polymerizable monomer is polymerized by the unsaturated bonds (described in, e.g., J. Polymer Sci., Part-A, 3, p.1031, 1965 and Japanese Patent Application Publication (JP-B) No. 5-5,845), and (3) a method wherein a structure which acts as an initiator is introduced into a material and a polymerizable monomer is polymerized by the structure (described in, e.g., Tappi, March, 56, p.97, 1973 and Japanese Patent Application Laid-Open (JP-A) No. 6-287,243).

Among these methods, method (1) is preferably employed, and a system utilizing an initiator in particular is widely employed.

As a graft polymerization initiator (hereinafter referred to simply as "an in initiator" on occasion), a redox initiator is industrially employed, and conventionally known examples of the redox-based initiator include ammonium cerium(IV) nitrate, Fenton's reagent (an $H_2O_2$/Fe system and the like), and a manganese-based system. According to graft polymerization using these initiators, the polymerization is generally performed in water or in a solvent system mixed with water. Details of these graft polymerization technologies illustrative of an example of a graft polymerization onto a hydrophilic polymer are described in, e.g., Fusayoshi Masuda, "Highly Water-absorbing Polymer, Polymeric New Materials, One Point-4", Polymer Soc. Japan. Ed. and "J. Appl. Polymer Sci., 19, p.1257, 1975".

According to conventional graft polymerization, the amount of the polymer grafted (generally referred to as a grafting ratio) onto a target material or the surface of a substrate to be grafted is controlled by the selection of an initiator, the type or structure of the initiation site, the concentration of the initiator, the concentration of a polymerizable monomer, and a solvent.

However, in a system according to a conventional method for graft polymerization, in particular a system using a redox initiator, it is difficult to control the molecular weight of the graft polymer and the grafting ratio, and it is also difficult to control the high-order structures, such as the morphology and the areal density, of the graft polymer which is formed on a substrate. That is, although it is possible to change the number of polymerizable monomers, which become the graft polymers, bonded to a unit area on the substrate surface by changing, for example, the concentration of the initiator, it has been impossible to make nonuniform the bonding density of the graft polymers on the surface of a substrate, for example, to obtain a surface structure comprising a region (domain) which has a plurality of graft polymers bonded and a non-grafted domain. Despite an attempt to obtain the above-described high-order structure by a method comprising partially masking the surface of a substrate and then performing a graft polymerization onto only the non-masked region (JP-B No. 62-7,931), this method is not practical because of limitations such as complexity of process and, in addition, this method cannot be applied to polyhedral substrates such as fibers and particles.

The high-order structural modification of the substrate surface as described above is useful as a means of modifying the surface physical properties, such as steric space, electrical potential, and free energy, in various applications, but conventional methods for this purpose are not satisfactory because the degree of freedom in controlling the high-order structure is low.

For the purpose of obtaining a so-called functional surface combining a plurality of functions on the substrate surface, a method hitherto employed consists of utilizing as a copolymer a graft polymer itself which is grafted onto a substrate. The problem of this method is that the modification of surface properties achieved by this method is only of microscopic order, and, therefore, the modification of surface properties by this method cannot provide the functions to match those which can only be achieved by some degree of macroscopic assembly of graft polymers.

A still further problem of the conventional method for graft polymerization has been that graft polymerization performed in an aqueous solvent produces a large amount of a polymer product not grafted onto the target material (this polymer is hereinafter referred to as "a homopolymer"), which leads to the reduction in reaction efficiency and an enormous amount of work required in the purification of the reaction product. Although the formation of a homopolymer is inhibited by a technology (A.C.S., Symp. Ser., No. 187, p.45, 1982) comprising the steps of reacting an initiator with a material or a substrate in an aqueous solvent, exchanging the aqueous solvent with a non-aqueous solvent, and performing graft polymerization, this technology is complicated and not suitable to industrial use because the solvent exchange must be carried out under an inert gas.

SUMMARY OF THE INVENTION

A first object of the present invention is to provide a composite material comprising a substrate, having a three-dimensional structure, which is composed of a polymeric material and has a polymeric material, different from the polymeric material of the substrate, chemically bonded to at least the surface of the substrate, wherein the fine structure on the surface of the substrate having a three-dimensional structure is nonuniform such that the fine structure has a nonbonded domain where the polymeric compound is not bonded.

A second object of the present invention is to provide a biodegradable composite material comprising a substrate having a three-dimensional structure which is composed of a biodegradable polymeric material and has a polymeric material, different from the polymeric material of the substrate, chemically bonded by means of a graft polymerization to at least the surface of the substrate, wherein the fine structure of the surface of the substrate having a three-dimensional structure is nonuniform such that the fine structure has a nonbonded domain where the polymeric compound is not bonded.

A third object of the present invention is to provide a method for graft polymerization, said method having a high degree of freedom in controlling the amount, density, grafting ratio and the like of the graft polymers to be formed on a substrate having a three-dimensional structure, and in particular said method being able of controlling at will the surface structure comprising the graft polymers on the surface of substrate, for example, a high-order structure, such as a sea/island structure of (a mottled structure), composed of domains made up of an assembly of regions where the graft polymers are bonded along with non-grafted regions.

A fourth object of the present invention is to provide a method for graft polymerization, said method enabling even a non-aqueous, polymerizable monomer, which cannot be polymerized by a polymerization method in an aqueous solvent, to be easily graft-polymerized.

A fifth object of the present invention is to provide a method for graft polymerization, said method being capable of easily inhibiting the formation of a homopolymer in a polymerization process.

In the present invention, for use in biodegradable applications, preferred examples of the substrate having a three-dimensional structure, to the surface of which a polymerizable monomer is chemically bonded by graft polymerization, include biodegradable polymeric materials such as polysaccharide-based polymers, polypeptide-based polymers, polyester-based polymers, polyvinyl-based polymers and mixtures thereof.

The composite material of the present invention comprises a substrate, having three-dimensional structure, having, over substantially the entire surface thereof, regions where a polymerizable unsaturated compound is graft-bonded and regions where the polymerizable unsaturated compound is not graft-bonded.

The composite material of the present invention is prepared by a process comprising reacting the surface of a substrate having a three-dimensional structure composed of the polymeric material with droplets of a solution containing a graft polymerization initiator in a suspension or an emulsion comprising the solution containing a graft polymerization initiator and a solvent immiscible with the solution containing the graft polymerization initiator so as to form polymerization initiating regions on the surface of the substrate and then graft-polymerizing a polymerizable unsaturated compound to the polymerization initiating regions formed on the surface of the substrate. The fine structure on the surface of the substrate having a three-dimensional structure is nonuniform so that the fine structure has a nonbonded domain where the different type of polymeric material is not graft-polymerized.

The method for graft polymerization of the present invention comprises the step of reacting the surface of a substrate having a three-dimensional structure composed of the polymeric material with droplets of a solution containing a graft polymerization initiator in a suspension or an emulsion comprising the solution containing a graft polymerization initiator and a solvent immiscible with the solution containing the graft polymerization initiator so as to form polymerization initiating regions on the surface of the substrate and the step of graft-polymerizing a polymerizable unsaturated compound to the polymerization initiating regions formed on the surface of the substrate.

The method for graft polymerization of the present invention comprises a first graft polymerization step comprising the step of reacting the surface of a substrate composed of the polymeric material having a three-dimensional structure with droplets of a solution containing a graft polymerization initiator in a suspension, or an emulsion comprising the solution containing a graft polymerization initiator and a solvent immiscible with the solution containing the graft polymerization initiator, so as to form polymerization initiating regions on the surface of the substrate, and the step of graft-polymerizing the first polymerizable unsaturated compound to the polymerization initiating regions formed on the surface of the substrate and a second graft polymerization step of graft-polymerizing a second polymerizable unsaturated compound which is different from the first polymerizable unsaturated compound to the surface where the first graft polymerization does not take place.

The composite material of the present invention comprises the surface of a substrate composed of a polymeric material to which a polymeric compound of a different kind from the polymeric material chemically is bonded by graft polymerization, wherein the bonded state of the polymeric compound is nonuniform or partly present on the surface so that a domain (region) where the polymeric compound is not bonded is present. A preferred example of the surface structure is shown in FIG. 5A, and a cross section of the surface structure is shown in FIG. 5B. FIG. 5A illustrates a state of island-like domains where a plurality of polymeric compounds 2 of a different kind are present on the surface of a substrate 1. In FIGS. 5A and 5B, a numeral 3 indicates a domain where a different type of polymeric compounds are bonded, whereas a numeral 4 indicates nonbonded domain where the different type polymeric compounds are not bonded.

The nonbonded domain, which is present on the surface of the substrate of the composite material of the present invention and in which the polymeric compounds are not bonded, can take the form of an island or a continuous phase.

The substrate, which is used in the biodegradable material of the present invention, is preferably of a biodegradable material. In order to impart various functions to a biodegradable composite material, which is composed of the biodegradable material and a non-biodegradable material, without impairing the biodegradability, it is preferable that the nonbonded domain have at least a size which allows the formation of a true circle having a diameter of 5 nm or greater. This is because an enzyme molecule, which degrades the polymeric material of a substrate, and the steric effect of a composite material each play a role in the biodegradation of the polymeric material of the substrate.

According to the method for graft polymerization of the present invention, polymerization initiating sites can be selectively formed on a reacting surface by a process comprising dispersing an aqueous solution containing a graft polymerization initiator (this solution is hereinafter referred to as "an initiator solution" on occasion) in a state of a suspension or an emulsion in an organic solvent and then reacting the initiator solution with the surface of a substrate. Accordingly, it is possible to form graft polymers in a sea/island by selectively graft-polymerizing a polymerizable monomer to the domains having the polymerization initiating sites. That is, it is possible to form graft polymers so that a non-grafted region remains on the surface.

The method for forming a sea/island structure on the surface of a substrate according to the method of the present invention can find applications in, for example, controlling the electrostatic charge of electrophotographic materials such as toner and carriers, medical materials having a high compatibility with blood, and column materials for use in affinity chromatography and the like.

Further, if graft polymers of two or more types are formed on the surface of a substrate according to the method of the present invention, it is possible to obtain a surface having a plurality of functions derived from each type of graft polymer. The composite material thus obtained can be used in the aforementioned electrophotography, medical materials, chromatography, and the like.

BRIEF DESCRIPTION OF THE DRAWINGS

FIG. 2A illustrates a domain structure of graft polymers formed on the surface of a substrate when the diameters of the droplets of an initiator solution are uniform.

FIG. 2B illustrates a domain structure of graft polymers formed on the surface of a substrate when the diameters of the droplets of an initiator solution are distributed.

FIG. 2C illustrates a domain structure formed on the surface of a substrate when the blending ratio of an initiator solution to a substrate is increased.

FIG. 2D illustrates a domain structure formed on the surface of a substrate when the blending ratio of an initiator solution to a substrate is further increased.

FIG. 2E illustrates a domain structure formed on the surface of a substrate when shear by high-speed stirring is provided to the stage of reaction between the droplets of an initiator solution and the substrate.

FIG. 4A is a drawing illustrating the surface state of a substrate having both domains of graft polymers A and domains of graft polymers B; and FIG. 4B is a diagram illustrating a surface state formed when the concentration of an initiator solution with respect to a substrate is sufficiently high, or when the second graft polymers B are formed in a conventional aqueous solvent.

FIG. 5A is a drawing illustrating a state of the presence of island-like domains where a plurality of polymeric compounds 2 of a different kind are bonded to the surface of a substrate 1; and FIG. 5B is a schematically illustrated drawing of a cross-section of a composite material in the state of FIG. 5A.

DESCRIPTION OF THE PREFERRED EMBODIMENTS

Figure 1A:
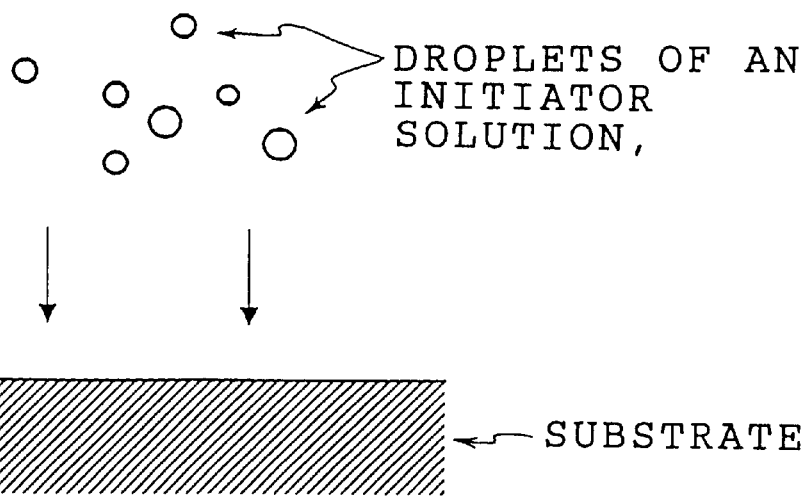
FIG. 1A is a drawing illustrating a state where droplets of an initiator solution in a suspension or an emulsion contact a substrate.
Figure 1B:
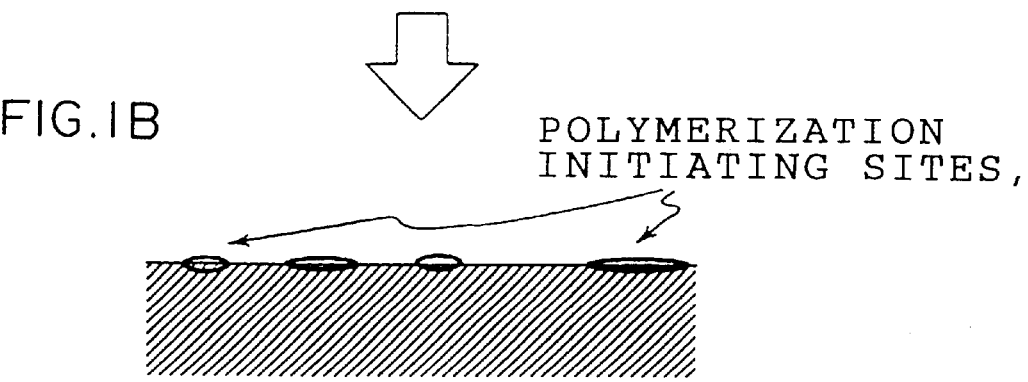
FIG. 1B a drawing illustrating a state where polymerization initiating sites are formed by the reaction between the initiator and the substrate.
Figure 1C:
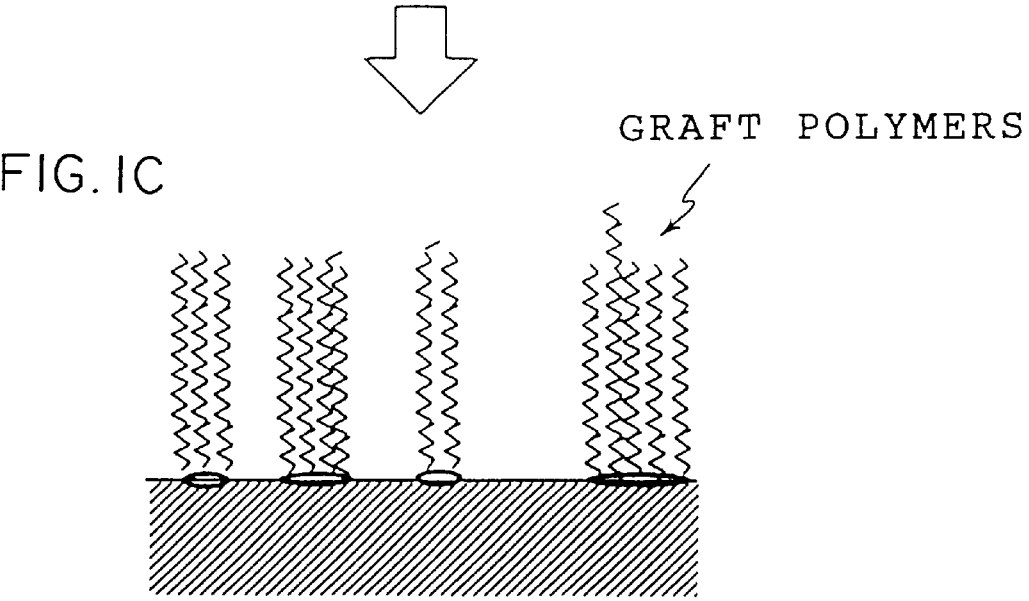
FIG. 1C is a drawing illustrating a state where graft polymerization is performed on the surface of a substrate by the grafting of polymerizable monomers onto the polymerization initiating sites, and, as a result, the composite material of the present invention is formed.
Figure 2A:
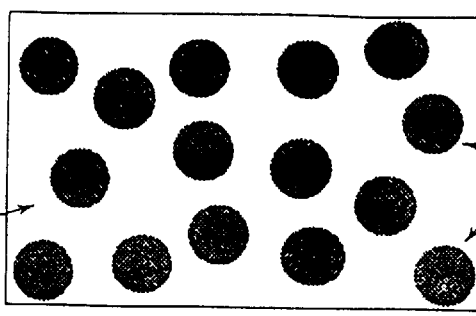
FIGS. 2A to 2E schematically illustrate examples of high-order structures formed by the method for graft polymerization of the present invention.
Figure 2B:
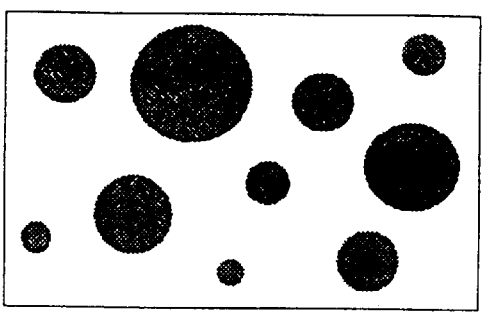
Figure 2C:
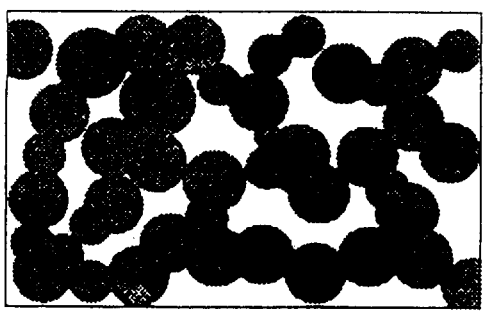
Figure 2D:
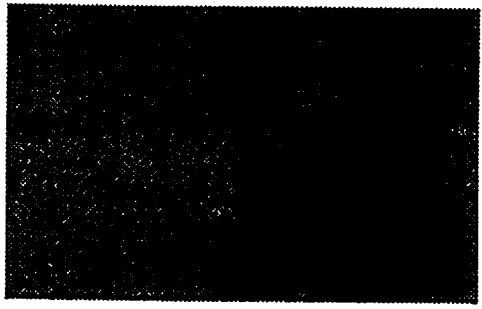
Figure 2E:
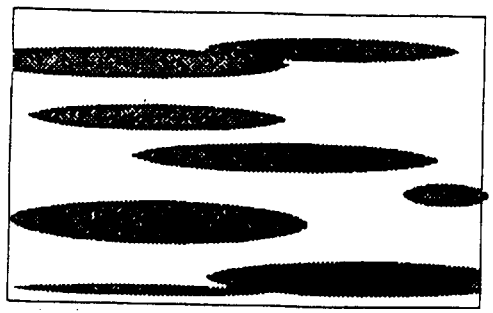

FIGS. 2A to 2E are drawings schematically illustrating the processes of the graft polymerization according to the method of the present invention. In these drawings, the contact between the droplets of an initiator solution in a suspension or an emulsion and a substrate (FIG. 1A) causes the initiator to react with the substrate to form polymerization initiating sites (FIG. 1B) and polymerizable monomers graft onto the polymerization initiating sites so that graft polymers are formed (FIG. 1C).

The size, density, shape and the like of the domain formed by an assembly of graft polymers bonded to the surface of a substrate can be controlled by conditions such as the size of the droplets made up of an initiator solution in a suspension or an emulsion, the proportion between the substrate and an initiator solution (e.g., ratio of the surface area of the droplets to the surface area of the substrate), and the condition of stirring the suspension or the emulsion. For example, the size of a domain to be formed on a substrate becomes larger as the sizes of the droplets made up of an initiator solution become larger; the density of the domains become higher as the proportion of the initiator solution increases with respect to a substrate; and graft polymers can be formed on the entire surface of a substrate if the blending ratio of the initiator solution to a substrate is further increased. If a stream of liquid is produced by stirring or providing a shearing force to the suspension or the emulsion at the time of reaction, the shape of the domain formed corresponds to the stream of liquid.

Details of the specific conditions are given below.

The droplet size (diameter) of a suspension or an emulsion formed by dispersing an initiator solution in an organic solvent is in the range of from 0.001 $\mu$m to 1 mm, preferably in the range of from 0.001 to 100 $\mu$m, or more preferably in the range of from 0.01 to 10 $\mu$m. The suspension or the emulsion can be prepared by a process comprising mixing the initiator solution with an organic solvent and stirring or dispersing the resulting mixture in a mixer or a dispersing machine such as a roll mixer, a homogenizer, a ultrasonic wave disperser, a V-shaped mixer, a ribbon-type mixer, a paddle-type mixer, a screw-type mixer, a kneader, a pressurized kneader, and a double arm kneader, while the droplet diameter of the initiator solution in the suspension or the emulsion can be adjusted by the strength or time period of the stirring, temperature, types of organic solvents, additives (e.g., surfactants), and the like.

The ratio of the surface area of the substrate to the surface area of the initiator solution is selected from the range of from $1:10^6$ to $10^8:1$.

The volume ratio of the substrate to the initiator solution is selected from the range of from 1:1 to 10000:1.

The concentration of the initiator in an aqueous solution is preferably in the range of from 0.1 to 80% by weight. The proportion of the aqueous solution which contains an initiator and is dispersed in an organic solvent is preferably in the range of from 0.01 to 10% by weight.

Examples of the method for providing a liquid current to a suspension or an emulsion at the time of reaction include a method utilizing rotating blades, a method wherein a liquid is ejected from a nozzle, and a method wherein an initiator solution is ejected in a gas so that it reacts with a substrate.

Figure 3A:
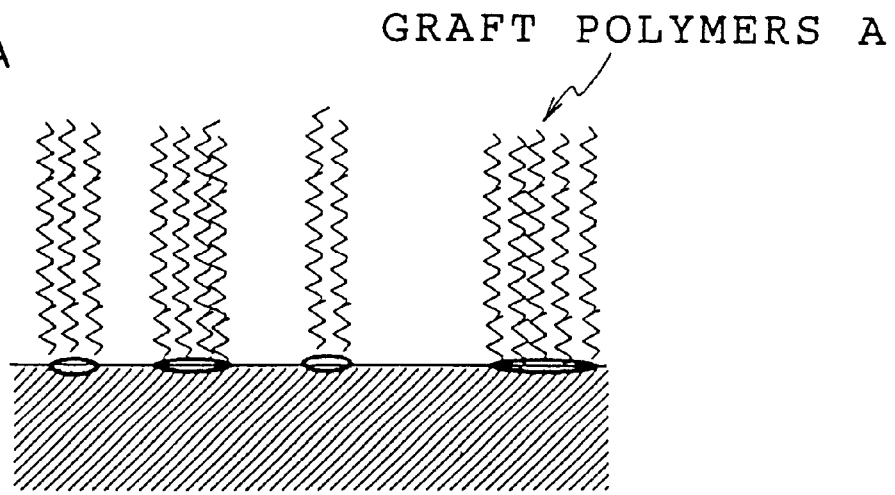
FIG. 3A is a drawing illustrating a state obtained by reacting the droplets of an initiator solution in a suspension or an emulsion containing the initiator solution and an organic solvent, with the surface of a substrate to form polymerization initiating sites partly on the surface and then graft-polymerizing the first polymerizable monomers so that graft polymers A are formed only on the part of the surface having thereon the polymerization initiating sites.
Figure 3A:
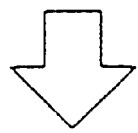
Figure 3B:
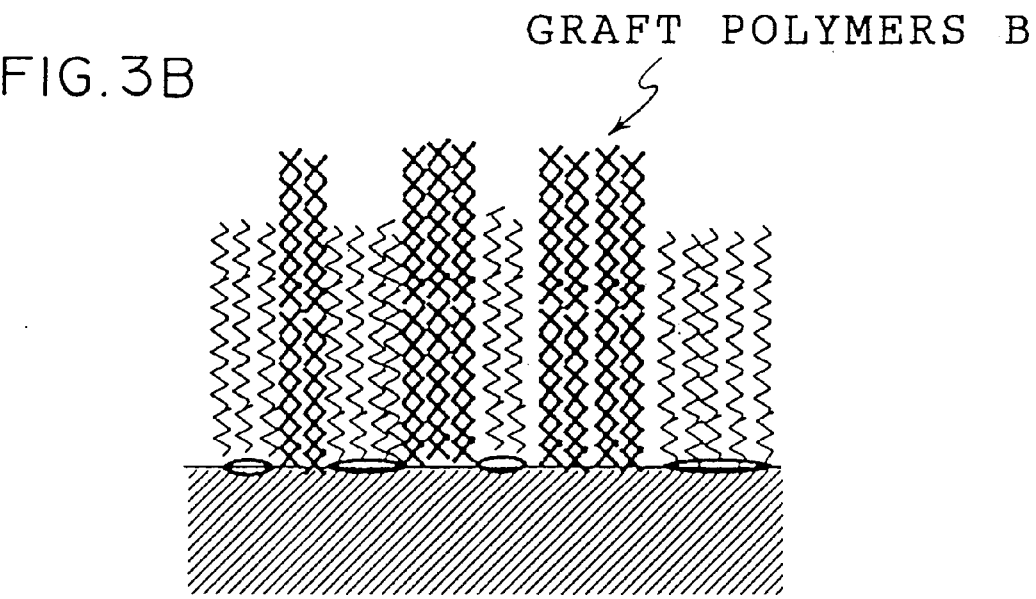
FIG. 3B is a drawing illustrating a state where the second graft polymers B are formed on the part of the surface where the first graft polymerization does not take place.

Further, the present invention makes it possible to form on a substrate domains in such a way such that the type of graft polymers in one domain differs from the type of graft polymers in another domain. More specifically, as shown in FIG. 3A, a first graft polymerization is carried out by reacting the droplets of an initiator solution in a suspension or an emulsion comprising the initiator solution and an organic solvent with the surface of a substrate so that polymerization initiating sites are formed partly on the surface and then graft-polymerizing polymerizable monomers so that graft polymers A are formed only on the part of the surface having thereon the polymerization initiating sites; and thereafter a second graft polymerization is carried out so as to form other graft polymers B on the part of the surface where the first graft polymerization does not take place, as shown in FIG. 3B.

If the second graft polymerization is carried out according to the method of the present invention, a surface state having domains of graft polymers A and B, as shown in FIG. 4A can be obtained. In this case, unreacted regions, where none of the graft polymers A and B are formed, can be further subjected to a third, a fourth, . . . and an n th graft polymerization, i.e., an n number of times of graft polymerization in total, according to the method of the present invention so that domains of n kinds of graft polymers can be formed on the surface of a substrate.

Meanwhile, if the second graft polymerization is carried out in a conventional aqueous solvent, or if the second graft polymerization is carried out according to the method of the present invention wherein the amount of the initiator solution is sufficiently high with respect to a substrate, it is possible to produce a surface state having domains where graft polymers A are formed while graft polymers B are formed on the entire surface areas other than the domains of the graft polymers A as shown in FIG. 4B.

Next, details of the materials for use in the present invention are given below.

Preferred initiators are water-soluble redox radical initiators. Possible initiators include cerium salt based compounds such as ammonium cerium(IV) nitrate, a Fenton's reagent such as a $H_2O_2$/Fe system, manganese salt based compounds, vanadium salt based compounds, and cobalt complexes. These initiators may be admixed with a variety of compounds such as acids.

The aforementioned redox initiators are particularly preferable to a substrate having reductive functional groups such as hydroxyl groups and amino groups in the case where the substrate is of a biodegradable polymeric material.

Water, a mixture of water and alcohol, a mixture of water and ether, a mixture of water and ketone, or the like can be used as an aqueous solvent which dissolves an initiator.

An aromatic solvent, an aliphatic solvent, an ester-based solvent, an ether-based solvent, a halogen-containing solvent, or the like can be used as an organic solvent which disperses an aqueous solution containing an initiator. Specific examples of the solvent include toluene, benzene, xylene, hexane, cyclohexane, ethyl acetate, butyl acetate, methylene chloride and mixtures thereof. Preferred organic solvents are those which do not dissolve the substrate at the time of graft polymerization.

An organic compound such as a polymer or an inorganic compound can be used as a substrate having a three-dimensional structure which undergoes graft polymerization. More specifically, examples of the substrate are a polymeric material having a reductive group such as hydroxyl, aldehyde, or amino, or a polymerizable group such as unsaturated double bond in the molecule or on the surface of the substrate, or an inorganic material having groups similar to the foregoing groups which are introduced by a reaction or the like into the surface of the inorganic material. Particularly, in a system where a redox initiator is used, the use of a material having a reductive group such as hydroxyl, aldehyde, or amino is preferable. Further, from the standpoint of the affinity for the droplets of an aqueous solution containing an initiator as specifically set forth in the present invention, a highly hydrophilic material is preferable. Specific examples of these materials include cellulose and cellulose derivatives, such as methyl cellulose, ethyl cellulose, hydroxyethyl cellulose, hydroxypropyl cellulose, carboxymethyl cellulose and sulfonated methyl cellulose, starch and substituted derivatives thereof similar to the foregoing cellulose derivatives, seaweed-derived agarose, carrageenan and alginic acid, crustacea-derived chitin, chitosan and derivatives thereof, plant-derived pectin and konjak mannan, microoganism-derived duran gum, xanthan gum, and curdlan, polysaccharides such as hyaluronic acid, synthetic polymers, such as polyvinyl alcohol and derivatives thereof, poly(meth)acrylic acid and derivatives thereof, vinyl alcohol/(meth)acrylic acid copolymers and polyallylamine, polypeptide-based compounds, such as natural protein and poly(γ-glutamic acid) and poly(ε-lysine), biopolyesters and synthetic aliphatic polyesters, such as polyhydroxylactic acid, polyhydroxybutyric acid and copolymers thereof, and polymer blends of a polysaccharide-based compound with a biopolyester, a synthetic polyester or polyvinyl alcohol (e.g., "Mater-Bi" (trade name) which is a blend of starch with a modified polyvinyl alcohol).

These polymers maybe a three-dimensionally cross-linked structural body or a so-called polymer gel. The materials of the substrate are preferably those which do not dissolve in an organic solvent at the time of graft polymerization.

Among these materials, a polysaccharide-based compound as well as a blend of a polysaccharide-based compound with a synthetic polymer are preferably used for biodegradable composite material, because these materials are advantageous in that they are inexpensive, highly biodegradable and safe to living things. These biodegradable polymeric materials may be incorporated with a variety of additives such as organic or inorganic fillers, colorants, for example, inorganic pigments, organic pigments and dyes, and stabilizers.

The substrate may be composed of a plurality of materials. For example, the substrate may be made from a specific material exemplified by a laminated body or a blend made up of a resin, such as polyester, polyamide, polystyrene, poly(meth)acrylate, polyethylene, polypropylene, polyacetal or polyether, together with a polymeric material described above which has a reductive group.

The substrate may take a variety of forms such as a block, a film, a tube, fibers, particles, microcapsules, and a coated substrate.

The polymerizable monomer which can be used in the graft polymerization is a monomer or a mixture of monomers selected from cross-linking monomers, for example, (meth)acrylate-based compounds, (meth)acrylic acid, vinyl sulfonate, (meth)acrylamide and derivatives thereof, vinyl acetate, vinylpyrrolidone, styrene and halogen-, alkyl- or heteroatom-substituted compounds thereof, unsaturated compounds such as ethylene, butadiene, isoprene, propylene, (meth)acrylonitrile, vinyl chloride and vinylidene chloride, divinyl-based compounds such as divinylbenzene, di(meth)acrylate-based compounds such as ethylene glycol di(meth)acrylate, tri(meth)acrylate-based compounds, tetra(meth)acrylate-based compounds, and di(meth)acrylamide-based compounds such as methylenebis (meth)acrylamide.

The articles produced by the present invention can be used in various applications according to the combinations of graft polymers and substrates on which these graft polymers are formed, and also according to the microstructural species of the graft polymers formed.

Examples of the applications include water-absorbing materials, hydrophilic materials, functional paper, filters, materials for chromatography, hygroscopic materials, adsorbing materials, medical materials, structural materials, toner for electrophotography, ink, thickeners, medical fibers, and biodegradable materials in the foregoing applications.

For each of these applications, explanations about preferred combinations of substrates and graft polymers as well as about the structures of the graft polymers are given below.

Materials, which can be used in applications such as water-absorbing materials, hydrophilic materials, adsorbing materials and hygroscopic materials, are preferably those prepared by forming hydrophilic graft polymers having ionic groups or the like on the surface of a substrate in the form of fibers, particles or films. Preferred examples of the substrate are polysaccharide-based polymers such as cellulose, cellulose derivatives, cellulose-based copolymers, chitin and derivatives thereof, and chitosan and derivatives thereof, blends of polysaccharide-based polymers and other polymers, and materials coated with polysaccharide-based polymers. Preferred examples of the hydrophilic graft polymers include metallic salts of poly(meth)acrylic acid, copolymers of metallic salts of poly(meth)acrylic acid, copolymers of metallic salts of maleic acid, polystyrenesulfonic acid and metallic salts thereof, copolymers of styrenesulfonic acid and copolymers of metallic salts thereof, polyvinylsulfonic acid and metallic salts thereof, copolymers of vinylsulfonic acid and copolymers of metallic salts thereof, poly(meth)acrylamidealkylsulfonic acid and metallic salts thereof, copolymers of (meth)acrylamidealkylsulfonic acid or copolymers of metallic salts thereof, poly(meth)acrylamide, copolymers of (meth)acrylamide, polydialkyl-substituted (meth)acrylamide such as polydimethylaminoacrylamide, copolymers of dialkyl-substituted (meth)acrylamide, polydialkyl-substituted aminoalkyl(meth)acrylate or quaternary salts thereof, polyvinylpyridine or quaternary salts thereof, copolymers of vinylpyridine or quaternary salts thereof, copolymers of dialkyl-substituted aminoalkyl(meth)acrylate or quaternary salts thereof, polyhydroxyethyl(meth)acrylate, copolymers of hydroxyethyl(meth)acrylate, polyhydroxypropyl(meth) acrylate, copolymers of hydroxypropyl(meth)acrylate, poly[glyceryl(meth)acrylate], copolymers of glyceryl(meth) acrylate, polyethylene glycol, polyvinyl alcohol, polyvinylpyrrolidone and copolymers thereof, poly[methoxypolyethylene glycol mono(meth)acrylate] and copolymers thereof. These graft polymers may be cross-linked.

Materials for use in medical applications take various structures. Where these materials are used as an antithrombotic material, it is preferable that the surface of the material has a sea/island type nonuniform structure composed of domains of different materials (generally a hydrophilic material and a hydrophobic material) or a steric structure provided with fine ruggedness. These materials can be used as materials for dialysis membranes, artificial organs or cell culture, and cell immobilization. According to the present invention, it is possible to easily form the aforementioned structure, because the present invention makes it possible to form domains, each composed of an assembly of graft polymers, partly or nonuniformly on the surface of a substrate. This nonuniform structure may comprise domains which are each composed of an assembly of graft polymers and which are partly present on a substrate, or may comprise two or more kinds of domains each composed of an assembly of graft polymers of a different kind. In the nonuniform structure, the size of each domain is preferably in the range of from 1 nm to 1 mm. Where the fine rugged structure is formed, the height of the convex portions is preferably in the range of from 1 nm to 10 μm. A catheter or a guide wire, which is to be introduced into the human body, preferably has a high level of surface hydrophilicity which enables the surface resistance to decrease when contacted by a humor so that the human tissue is not damaged. According to the present invention, it is possible to obtain the above-described hydrophilic surface, because the present invention makes it possible to form hydrophilic graft polymers in a desired structure and density.

In the use as medical materials, examples of preferred graft polymers to be combined with a substrate include polystyrene and copolymers thereof, substituted-derivatives of polystyrene and copolymers thereof, alkyl poly(meth) acrylate such as polymethyl methacrylate and copolymers thereof, poly(meth)acrylonitrile and copolymers thereof, polyvinyl chloride and copolymers thereof, polyvinylidene chloride and copolymers thereof, polyvinyl acetate and copolymers thereof, polyethylene and copolymers thereof, polybutadiene and copolymers thereof, polyisoprene and copolymers thereof, polypropylene and copolymers thereof, polyester, polyether, polyurethane, polyurea, polycarbonate, and polyamide, in addition to the graft polymers described as preferable ones to be combined with a substrate in the aforementioned applications such as water-absorbing materials. These graft polymers may be cross-linked.

In the use as materials for toner in electrophotography, various graft polymers can be formed in order to control the electrostatic charge of the surface or to impart fluidity to the surface of polymer particles or microcapsules containing a colorant. Preferred examples of the substrate are polyester resins, cellulose derivatives, styrene, copolymers of styrene, acrylic resins, and blends thereof, each containing a colorant such as pigment or the like. In the case of graft polymers for the purpose of controlling electrostatic charge, preferable polymers are polymers which have carboxyl groups and are represented by poly(meth)acrylic acid, polymers which have sulfonic acid groups and are represented by polyacrylamidemethylpropanesulfonic acid, and polymers having amino groups, boric acid groups or the like. In the case of graft polymers for the purpose of imparting fluidity, preferable polymers are fluorine-based polymers and silicone-based polymers. Further, as to the structure of the graft polymers on the surface of the substrate, domains, each composed of an assembly of graft polymers, may be formed partly on the surface of the substrate, or otherwise two or more kinds of domains, each composed of an assembly of graft polymers of a different kind, may be formed on the surface of the substrate. For example, it is possible to control functions in a well-balanced way by forming on the same substrate those domains which are composed of graft polymers related to electrostatic charging properties and other domains which are composed of graft polymers related to fluidity and the like. In this way, materials having excellent properties can be obtained by optimizing the kinds of the graft polymers or the density of the domains.

Examples of materials for use in ink such as ink-jet ink recording ink include a material whose dispersion stability in a dispersing medium such as water is increased by forming graft polymers on the surface of resin particles containing pigment particles and colorants. As a substrate of this material, particles of pigments such as inorganic pigments and organic pigments can also be used in addition to the colorant-containing resin particles similar to those for use in the aforementioned toner for electrophotography. Preferably, these particles have hydrophilic polymers such as those described above formed on the surface as graft polymers. As to the structure of the graft polymers on the surface of the substrate, domains, each composed of an assembly of graft polymers, may be formed partly on the surface of the substrate, or otherwise two or more kinds of domains, each composed of an assembly of graft polymers of a different kind, maybe formed on the surface of the substrate.

Examples of materials for adsorbing materials or for use in chromatography are materials utilizing a variety of resin particles or polymeric fibers as substrates which have formed thereon graft polymers comprising ionic groups or polar groups, such as amino groups, carboxyl acid groups and salts thereof, and sulfonic acid groups and salts thereof, invested with adsorbing function or selectivity to substances. As to the structure of the graft polymers on the surface of the substrate, domains, each composed of an assembly of graft polymers, may be formed partly on the surface of the substrate, or otherwise two or more kinds of domains, each composed of an assembly of graft polymers of a different kind, may be formed on the surface of the substrate. In this way, materials having excellent adsorbing properties or selectivity to substances can be obtained by optimizing the kinds of the graft polymers or the density of the domains.

Examples of materials for applications in functional paper include materials utilizing pulp fibers as substrates which have various graft polymers formed thereon according to purposes such as improvement of ink fixing ability, water absorption, and fortification of fibers (strength of paper). For example, pulp whose water absorption is increased by the formation of hydrophilic graft polymers can be used as ink-jet recording paper or hygroscopic paper. In addition to these graft polymers, the aforementioned various materials can be used as graft polymers. As to the structure of the graft polymers formed on the surface of the substrate, domains, each composed of an assembly of graft polymers, may be formed partly on the surface of the substrate, or otherwise two or more kinds of domains, each composed of an assembly of graft polymers of a different kind, maybe formed on the surface of the substrate.

Examples of materials for applications in clothing include materials utilizing fibers as substrates which have various graft polymers formed thereon so that water absorption or dye affinity is improved. In these applications, the purposes can be achieved by using natural fibers, polyester-based fibers, nylon-based fibers or acrylic fibers as a substrate, and forming the aforementioned various graft polymers on the substrate.

In a biodegradable application, a material excellent both in functions and in biodegradability can be obtained by optimizing the kinds of substrates and the bonded structures of the graft polymers in the aforementioned variety of applications. These materials comprise a substrate, which is a polymeric material excellent in biodegradability, and domains which are composed of graft polymers and formed partly on the substrate. In these materials, it is necessary that the nonbonded domain, where the graft polymers (polymeric compounds) are not bonded, have a region of a size which allows the formation of a true circle having a diameter of at least 5 nm. Since enzymes can easily invade this surface structure and react with the substrate, the material having this surface structure exhibits excellent biodegradability. Examples of the substrate excellent in biodegradability include polysaccharide-based polymers, such as cellulose, cellulose derivatives, starch, starch derivatives, chitin, chitin derivatives, chitosan, chitosan derivatives and agarose, polypeptide-based compounds, such as natural protein and poly($\gamma$-glutamic acid) and poly($\epsilon$-lysine), biopolyesters and synthetic aliphatic polyesters, such as polyhydroxylactic acid and copolymers thereof, polyhydroxybutyric acid and copolymers thereof, polyvinyl alcohol and derivatives thereof, vinyl alcohol/(meth)acrylic acid copolymers and salts thereof, and blends of a polysaccharide-based polymer with a biopolyester, a synthetic polyester or polyvinyl alcohol (e.g., "Mater-Bi" (trade name) which is a blend of starch with a modified polyvinyl alcohol). As for the graft polymers, the aforementioned various materials are selected and used according to purposes.

Furthermore, the materials of the present invention can be used as structural materials having various surface functions. Examples of these surface functions include hydrophilicity, wettability, surface frictional resistance, electrostatic chargeability, electrical conductivity, dyeing properties, adsorptive properties of substances, and adhensiveness. These functions can be imparted by appropriately selecting graft polymers having the aforementioned various functions.

Where the substrate is composed of a biodegradable polymeric material, the amount of the polymeric compound which is chemically bonded to the surface of the substrate by graft polymerization is preferably in the range of from 0.1 to 200 parts by weight per 100 parts by weight of the biodegradable polymeric material. The proportion of the area of the bonded domains of the polymeric compounds to the surface area of a formed product composed of the biodegradable polymeric material is preferably in the range of from 99 to 1%.

The term "bonded domain of polymeric compounds" as used herein means the portion of a domain formed, on the surface of a substrate, from a polymeric material whose bonded polymeric compounds have uneven bonding densities, where a large number of polymeric compounds are bonded. In contrast with the bonded domains, other domains (i.e., nonbonded domains) to which none of the polymeric compounds are chemically bonded are also present on the surface of the substrate composed of a polymeric material. The above-mentioned proportion of the area of the bonded domains of the polymeric compounds to the surface area is defined as the proportion of the cumulative areas of the bonded domains to the surface area.

As set forth previously, in the case where a substrate is composed of a biodegradable polymeric material, it is preferable that the nonbonded domain have a region of a size which allows the formation of a true circle having a diameter of 5 nm or greater. This is because spatial steric hindrances needs to be decreased to form spaces greater than the diameter (about 5 nm) of ordinary enzyme molecule in order that passage, invasion and contact of an enzyme molecule to the surface of the substrate composed of the biodegradable polymeric material can be facilitated.

Next, further details of the method for graft polymerization of the present invention are given below.

When forming a suspension or an emulsion by dispersing an aqueous solution containing an initiator into an organic solvent, the aqueous solution containing an initiator may be dispersed in a predetermined amount of the organic solvent to form the suspension or the emulsion in advance by stirring, utilizing a vibrating or rotating stirring apparatus or an ultrasonic radiating apparatus, so that the resulting suspension or the emulsion is added to a reaction system, or alternatively, the aqueous solution containing the initiator may be added to the reaction system and then the aqueous solution containing the initiator may be dispersed in a similar way. In the dispersing process, it is preferable to use a surfactant, and in particular to use a surfactant which is a w/o type surfactant having a low H.L.B value (hydrophile-lipophile balance). Examples of this surfactant include sorbitol-based esters and ethylene oxide-based compounds. The amount added of the surfactant is preferably in the range of from 0.01 to 10% by weight based on the amount of the organic solvent.

The contact and reaction between a substrate and the droplets of the aqueous solution containing an initiator in an organic solvent while being stirred by means of a vibrating or rotating stirring apparatus or by providing ultrasonic wave by means of an ultrasonic radiating apparatus cause radicals on the surface of the substrate, which radicals act as polymerization initiating sites. A polymerizable monomer may be added to the reaction system in advance, or it may be added to the reaction system after the formation of the polymerization initiating sites on the substrate.

In the above-mentioned process, a preferable operation lies in a procedure comprising the steps of mixing a substrate with an organic solvent, adding a polymerizable monomer to the mixture, and further adding to the resulting mixture a suspension or an emulsion which has been prepared in another step by dispersing an aqueous solution containing an initiator into an organic solvent, and then polymerizing the resulting reaction mixture, or in a procedure comprising the steps of mixing a substrate with an organic solvent, adding to the resulting mixture a suspension or an emulsion which has been prepared in another step by dispersing an aqueous solution containing an initiator into an organic solvent, stirring the mixture, adding a polymerizable monomer to the mixture, and then polymerizing the resulting reaction mixture.

As in conventional technologies, the operations or reactions of the above-described radical polymerization are preferably carried out in an atmosphere of an inert gas such as nitrogen, argon, or helium.

As in conventional technologies, the molecular weight of the graft polymers to be formed can be controlled by the concentration of an initiator and the concentration of a polymerizable monomer so that the molecular weight of the graft polymers to be formed generally becomes larger if the concentration of a initiator is decreased or the concentration of a polymerizable monomer is increased.

One of the features of the method for graft polymerization of the present invention is that the formation of a high-order structure such as a sea/island structure can be controlled by the procedure comprising reacting a suspension or an emulsion of an aqueous solution containing an initiator with a substrate to produce reacted surface regions and unreacted surface regions so that polymerization initiating sites are generated in the form of domains on the surface of the substrate, and then carrying out graft polymerization selectively at the polymerization initiating sites. That is, the method according to the present invention makes it possible to control the high-order structure or morphology of the surface more freely or more precisely in the modification of the surface by graft polymerization. The structure and the density of the graft polymers to be formed on the surface of a substrate can be controlled at will because the change in the size of the droplets or the concentration of an initiator solution contained in the suspension or in the emulsion proportionally changes the size of the domain or the density of the domains of the polymerization initiating sites to be formed on the substrate so that the size of the domain is larger if the size of the droplets is larger, whereas the size of the domain is smaller if the size of the droplets is smaller, to form graft polymers on these domains, and because the density of the domains of the graft polymers on the surface of the substrate varies with the concentration of the droplets. Meanwhile, the shape and the like of the domain of the graft polymers to be formed on a substrate can be controlled by providing a force by stirring or rotation to the process where the droplets of an initiator solution contact and react with the substrate.

Since the present invention utilizes the graft polymerization based on the reaction mechanism between a substrate and an initiator as stated above, the surface structure can be controlled not only in the case of a planar substrate but also in the case of a polyhedral substrate such as fibers or particles.

Further, since the method according to the present invention is based on a polymerization system of an organic solvent system except for the peripheries of the polymerization initiating sites, the chain transfer and the like of the radicals into the solvent can be inhibited. In this way, the formation of homopolymers can be inhibited and, as a result, the efficiency of the graft polymerization is high. Furthermore, since the method according to the present invention is based on a polymerization system of an organic solvent system, water-insoluble monomers can be used as polymerizable monomers for the graft polymerization.

EXAMPLES

Example 1

10 g (total volume: about 8.33 cm$^3$; total surface area: about 6666 cm$^2$) of cellophane film pieces (thickness: about 25 μm; size: 1 cm×1 cm; specific gravity: about 1.2) as sample substrates was placed in a reaction vessel fitted with a stirrer. In addition, 35 ml of toluene as an organic solvent was placed in the reaction vessel. The atmosphere inside the reaction vessel was replaced with nitrogen, and the steps described below were performed under nitrogen.

A suspension of an initiator solution (diameter of droplets of initiator solution: about 8 μm), which was prepared by mixing 0.135 g of ammonium cerium(IV) nitrate as an initiator and 0.6 ml of 2N nitric acid aqueous solution (total volume of about 0.72 ml as an initiator solution) with 5 ml of a toluene solution containing 0.04 g of Sorgen 50 (sorbitan monostearate manufactured by Daiichi Kogyo Seiyaku Co., Ltd.) as a surfactant and by stirring the mixture under nitrogen, was introduced into the reaction vessel, and the suspension was stirred together with the cellophane pieces to react for 2 minutes [ratio of the substrate to the droplets of the initiator solution=1:1 (surface area ratio); 12:1 (volume ratio)]. Then, the reaction vessel was set on a bath whose temperature was set to a constant temperature of 25° C.

Next, 10 g of styrene as a polymerizable, water-insoluble monomer was introduced into the reaction vessel, and graft polymerization was carried out for 5 hours. After the reaction, the sample was washed with toluene and distilled water and was then dried.

Since the weight of the sample was about 12.5 g, the weight increase indicated that the grafting ratio was 25% [{(12.5−10)/10}×100). The weight of the polymer component extracted in the washing solution after the washing was found to be about 0.1 g, which confirmed that almost no homopolymer was formed.

The result of IR surface analysis of the sample showed that polystyrene was graft-polymerized uniformly on the entire surface of the substrate.

Example 2

10 g (total volume: about 8.33 cm$^3$; total surface area: about 6666 cm$^2$) of cellophane film pieces (thickness: about 25 μm; size: 1 cm×1 cm; specific gravity: about 1.2) as sample substrates was placed in a reaction vessel fitted with a stirrer. In addition, 35 ml of toluene as an organic solvent was placed in the reaction vessel. The atmosphere inside the reaction vessel was replaced with nitrogen, and the steps described below were performed under nitrogen.

A suspension of an initiator solution (diameter of droplets of initiator solution: about 8 μm), which was prepared by mixing 0.135 g of ammonium cerium(IV) nitrate as an initiator and 0.6 ml of 2N nitric acid aqueous solution (total volume of about 0.72 ml as an initiator solution) with 5 ml of a toluene solution containing 0.04 g of Sorgen 50(sorbitan monostearate manufactured by Daiichi Kogyo Seiyaku Co., Ltd.) as a surfactant and by stirring the mixture under nitrogen, was introduced into the reaction vessel, and the suspension was stirred together with the cellophane pieces to react for 2 minutes [ratio of the substrate to the droplets of the initiator solution=1:1 (surface area ratio); 12:1 (volume ratio)]. Then, the reaction vessel was set on a bath whose temperature was set to a constant temperature of 25° C.

Next, 10 g of acrylic acid as a polymerizable monomer was introduced into the reaction vessel, and graft polymerization was carried out for 5 hours. After the reaction, the sample was washed with distilled water and was then dried.

Since the weight of the sample was about 15.5 g, the weight increase indicated that the grafting ratio was 55%. The weight of the polymer component extracted into a washing solution after washing was found to be about 0.2 g, which confirmed that almost no homopolymer was formed.

Using a cationic dye, the graft polymer (polyacrylic acid) portions of the sample were dyed, and the sample was observed under a microscope. The result of the observation showed that the acrylic acid was graft-polymerized uniformly on the surface of the substrate.

Example 3

10 g (total volume: about 8.33 cm$^3$; total surface area: about 6666 cm$^2$) of cellophane film pieces (thickness: about 25 μm; size: 1 cm×1 cm; specific gravity: about 1.2) as sample substrates was placed in a reaction vessel fitted with a stirrer. In addition, 35 ml of toluene as an organic solvent was placed in the reaction vessel. The atmosphere inside the reaction vessel was replaced with nitrogen, and the steps described below were performed under nitrogen.

A suspension of an initiator solution (diameter of droplets of initiator solution: about 8 μm), which was prepared by mixing 0.045 g of ammonium cerium(IV) nitrate as an initiator and 0.2 ml of 2N nitric acid aqueous solution (total volume of about 0.24 ml as an initiator solution) with 5 ml of a toluene solution containing 0.02 g of Sorgen 50 (sorbitan monostearate manufactured by Daiichi Kogyo Seiyaku Co., Ltd.) as a surfactant and by stirring the mixture under nitrogen, was introduced into the reaction vessel, and the suspension was stirred together with the cellophane pieces to react for 2 minutes [ratio of the substrate to the droplets of the initiator solution=3:1 (surface area ratio); 35:1 (volume ratio)]. Then, the reaction vessel was set on a bath whose temperature was set to a constant temperature of 25° C.

Next, 10 g of acrylic acid as a polymerizable monomer was introduced into the reaction vessel, and graft polymerization was carried out for 5 hours. After the reaction, the sample was washed with distilled water and was then dried.

Since the weight of the sample was about 14.5 g, the weight increase indicated that the grafting ratio was 45%. The weight of the polymer component extracted into a washing solution after washing was found to be about 0.2 g, which confirmed that almost no homopolymer was formed.

Using a cationic dye, the graft polymer (polyacrylic acid) portions of the sample were dyed, and the sample was observed under a microscope. The result of the observation showed a sea/island structure composed of dyed regions and undyed regions, which indicated that the sample had a nonuniform surface structure. The sizes of the dyed domains centered on the range of from about 20 to 50 µm.

Example 4

10 g (total volume: about 8.33 cm$^3$; total surface area: about 6666 cm$^2$) of cellophane film pieces (thickness: about 25 µm; size: 1 cm×1 cm; specific gravity: about 1.2) as sample substrates was placed in a reaction vessel fitted with a stirrer. In addition, 35 ml of toluene as an organic solvent was placed in the reaction vessel. The atmosphere inside the reaction vessel was replaced with nitrogen, and the steps described below were performed under nitrogen.

An emulsion of an initiator solution (diameter of droplets of initiator solution: about 1 µm), which was prepared by mixing 0.045 g of ammonium cerium(IV) nitrate as an initiator and 0.2 ml of 2N nitric acid aqueous solution (total volume of about 0.24 ml as an initiator solution) with 5 ml of a toluene solution containing 0.2 g of Sorgen 50 (sorbitan monostearate manufactured by Daiichi Kogyo Seiyaku Co., Ltd.) as a surfactant and by stirring the mixture under nitrogen, was introduced into the reaction vessel, and the emulsion was stirred together with the cellophane pieces to react for 2 minutes [ratio of the substrate to the droplets of the initiator solution=1:2 (surface area ratio); 35:1 (volume ratio)]. Then, the reaction vessel was set on a bath whose temperature was set to a constant temperature of 25° C.

Next, 10 g of acrylic acid as a polymerizable monomer was introduced into the reaction vessel, and graft polymerization was carried out for 5 hours at 25° C. After the reaction, the sample was washed with distilled water and was then dried.

Since the weight of the sample was about 15.5 g, the weight increase indicated that the grafting ratio was 55%. The weight of the polymer component extracted in the washing solution after the washing was found to be about 0.5 g, which confirmed that almost no homopolymer was formed.

Using a cationic dye, the graft polymer (polyacrylic acid) portions of the sample were dyed, and the sample was observed under an optical microscope. The result of the observation showed a fine sea/island structure composed of dyed regions and undyed regions, which indicated that the sample had a nonuniform surface structure. The dyed domains were fine, and the sizes were about 5 µm or less. In order to further observe surface structure in detail, the sample was treated with osmic acid and was then observed under an electron microscope. The result of the observation showed the formation a sea/island structure of composed of fine domains each having a size of about 1 µm.

Example 5

10 g of the cellophane film pieces (thickness: about 25 µm; size: 1 cm×1 cm) which were prepared in Example 3 as sample substrates and the surface of which was graft-polymerized with acrylic acid was placed in a reaction vessel fitted with a stirrer. In addition, 35 ml of toluene as an organic solvent was placed in the reaction vessel. The atmosphere inside the reaction vessel was replaced with nitrogen, and the steps described below were performed under nitrogen.

A suspension of an initiator solution (diameter of droplets of initiator solution: about 8 µm), which was prepared by mixing 0.045 g of ammonium cerium(IV) nitrate as an initiator and 0.2 ml of 2N nitric acid aqueous solution with 5 ml of a toluene solution containing 0.02 g of Sorgen 50 (sorbitan monostearate manufactured by Daiichi Kogyo Seiyaku Co., Ltd.) as a surfactant and by stirring the mixture under nitrogen, was introduced into the reaction vessel, and the suspension was stirred together with the cellophane pieces to react for 2 minutes. Then, the reaction vessel was set on a bath whose temperature was set to a constant temperature of 25° C.

Next, 10 g of methyl acrylate as a polymerizable monomer was introduced into the reaction vessel, and graft polymerization was carried out for 5 hours. After the reaction, the sample was washed with distilled water and was then dried.

Since the weight of the sample was about 13.5 g, the weight increase indicated that the grafting ratio was 35%. The weight of the polymer component extracted in the washing solution after the washing was found to be about 0.1 g, which confirmed that almost no homopolymer was formed.

Based on these results, it can be seen that graft polymers comprising polyacrylic acid and polymethyl acrylate were formed on the cellulose film. Further, as in Example 3, the surface structure was observed, and it was confirmed that a nonuniform surface structure was maintained.

Comparative Example 1

10 g of the cellophane film pieces (thickness: about 25 µm; size: 1 cm×1 cm) which were the sample substrates identical to those in Examples was placed in a reaction vessel fitted with a stirrer. In addition, 35 ml of water was placed in the reaction vessel. The atmosphere inside the reaction vessel was replaced with nitrogen, and the steps described below were performed under nitrogen.

0.135 g of ammonium cerium(IV) nitrate as an initiator, 0.6 ml of 2N nitric acid aqueous solution and 5 ml of water were mixed under nitrogen, and the mixture was introduced into the reaction vessel. The mixture was stirred together with the cellophane pieces to react for 2 minutes. Then, the reaction vessel was set on a bath whose temperature was set to a constant temperature of 25° C.

Next, 10 g of styrene as a polymerizable, water-insoluble monomer was introduced into the reaction vessel, and graft polymerization was carried out. However, the graft polymerization did not proceed because the styrene was insoluble in water. As a result, it was impossible to form graft polymers on the substrate.

Comparative Example 2

10 g of the cellophane film pieces (thickness: about 25 µm; size: 1 cm×1 cm) which were the sample substrates similar to those in Examples was placed in a reaction vessel fitted with a stirrer. In addition, 40 ml of toluene was placed in the reaction vessel. The atmosphere inside the reaction vessel was replaced with nitrogen, and the steps described below were performed under nitrogen.

0.135 g of ammonium cerium(IV) nitrate as an initiator and 0.6 ml of 2N nitric acid aqueous solution were mixed under nitrogen, and the mixture was introduced into the reaction vessel. The mixture was stirred together with the cellophane pieces to react for 2 minutes. However, the aqueous solution containing the initiator adhered to and reacted with only a part of the cellophane film piece. Then, the reaction vessel as such was set on a bath whose temperature was set to a constant temperature of 25° C.

Next, 10 g of styrene as a polymerizable, water-insoluble monomer was introduced into the reaction vessel, and graft polymerizationwas carried out for 5 hours. After the reaction, the sample was washed with toluene and distilled water and was then dried.

Since the weight of the sample was about 10.3 g, the weight increase indicated that the grafting ratio was about 3%. The solution contained a large amount of unreacted polymerizable monomers.

Close observation of the sample revealed that graft polymers were formed on only part of the cellophane film pieces, whereas graft polymers were not formed on most of the cellophane film pieces.

Comparative Example 3

10 g of the cellophane film pieces (thickness: about 25 μm; size: 1 cm×1 cm) which were the sample substrates similar to those in Examples was placed in a reaction vessel fitted with a stirrer. In addition, 35 ml of water was placed in the reaction vessel. The atmosphere inside the reaction vessel was replaced with nitrogen, and the steps described below were performed under nitrogen.

0.045 g of ammonium cerium(IV) nitrate as an initiator, 0.2 ml of 2N nitric acid aqueous solution and 5 ml of water were mixed under nitrogen, and the mixture was introduced into the reaction vessel. The mixture was stirred together with the cellophane pieces to react for 2 minutes. Then, the reaction vessel was set on a bath whose temperature was set to a constant temperature of 25° C.

Next, 10 g of acrylic acid as a polymerizable monomer was introduced into the reaction vessel, and graft polymerization was carried out for 5 hours. After the reaction, the sample was washed with distilled water and was then dried.

Since the weight of the sample was about 15.0 g, the weight increase indicated that the grafting ratio was 50%. The weight of the polymer component extracted in the washing solution after the washing was about 3 g. Accordingly, it was found that a large amount of homopolymers were formed, and the grafting ratio was low.

The graft polymer portions (polyacrylic acid) of the sample were dyed with a cationic dye and were observed under an optical microscope and an electron microscope as in the Examples. The results revealed that graft polymers were formed uniformly on the surface, and the high-order structures of Examples 3 and 4 could not be obtained.

Example 6

5.0 g of chemically bleached pulp from a broadleaf tree (fiber length: 0.5 to 2 mm; fiber width: 15 to 25 μm) was added to 100 ml of toluene, and the fibers were dispersed using a homogenizer. The dispersion thus obtained was placed in a reaction vessel, and the atmosphere inside the reaction vessel was replaced with nitrogen as an inert gas.

A suspension of an initiator solution was prepared by a process of mixing 0.135 g of ammonium cerium(IV) nitrate as an initiator and 0.6 ml of 2N nitric acid aqueous solution (total volume of about 0.72 ml as an initiator solution) with 5 ml of a toluene solution containing 0.04 g of sorbitan monostearate (Sorgen 50 manufactured by Daiichi Kogyo Seiyaku Co., Ltd.) as a surfactant under nitrogen and stirring the mixture at a high speed. The size as an average particle diameter of droplets of the aqueous initiator solution in the resulting suspension was about 10 μm. The suspension was introduced into the reaction vessel, and the suspension was stirred together with the pulp to react for 2 minutes. At this time, as a result of calculation, the volume ratio of the pulp to the droplets of the aqueous initiator solution was about 7:1, while the surface area ratio was about 2.3:1.

Then, the reaction vessel was set on a bath whose temperature was set to a constant temperature of 25° C. Next, 10 g of acrylic acid as a monomer and 0.01 g of methylenebisacrylamide as a cross-linking agent were introduced into the reaction vessel, and graft polymerization was carried out for 5 hours. After the reaction, the sample was washed with distilled water and was then dried.

Since the weight of the sample was found to be about 6.8 g, the weight increase indicated that the grafting ratio was 36%. The polymers grafted onto the pulp were dyed with a basic dye, and the state of the polymers was observed under an optical microscope. The observation confirmed a non-uniform texture composed of dyed domains and undyed domains, wherein the dyed domains were regions where polyacrylic acid was grafted, while the undyed domains were non-grafted regions. It was confirmed that the grafted regions accounted for about 50 to 60% of the surface area. Further, it was confirmed that non-grafted domains having diameters ranging from several μm to 20 μm were present.

In order to evaluate the performance of the sample as water-absorbing fibers, an aqueous solution of sodium hydroxide was reacted with the sample, and thereafter the sample was washed and dried so that the grafted polyacrylic acid portions were converted into sodium salts thereof.

The water-absorbing ability was evaluated according to a commonly employed method wherein the water-absorbing ability was calculated as the difference between the weight of sample saturated with pure water and the dry weight of sample before water absorption. According to the evaluation, 1.0 g of the sample absorbed about 18 g of pure water, and therefore the sample had an excellent water-absorbing ability indicated by 18 g/g. Since the untreated pulp has a water-absorbing ability of 8 g/g, the water-absorbing ability of the pulp which was combined with sodium polyacrylate gel was more than double of the water-absorbing ability of the untreated pulp.

(Evaluation of Biodegradability)

The biodegradability was evaluated according to the enzymolysis of the sample. Conditions are given below. 1.0 g of sample (dry weight) was added to 100 ml of a phosphoric acid-buffered aqueous solution having pH adjusted to 6.0. Further, 200 mg of a cellulose-decomposing enzyme (Cellulase manufacture by Wako Pure Chemical Industries, Ltd.) was added to the solution, and the reaction was carried out over 72 hours at 40° C. The biodegradability was evaluated according to the weight difference of the sample between before and after the reaction.

1.0 g of the sample was found to have a weight of 0.25 g after the reaction with the enzyme, and therefore the sample exhibited an excellent enzymolysis ratio indicated by 75%. Meanwhile, the degradation ratio of the pulp under the same condition was 82%, which confirmed that the sample of this example had an excellent biodegradability comparable to the biodegradability of the natural material, despite the fact that the sample of this example was a composite material.

Example 7

5.0 g of the same pulp as in Example 6 was added to 90 ml of toluene, and the fibers were dispersed by using a homogenizer. The dispersion thus obtained was placed in a reaction vessel, and the atmosphere inside the reaction vessel was replaced with nitrogen as an inert gas.

A suspension of an initiator solution was prepared by a process of mixing 0.067 g of ammonium cerium(IV) nitrate as an initiator and 0.3 ml of 2N nitric acid aqueous solution (total volume of about 0.36 ml as an initiator solution) with 5 ml of a toluene solution containing 0.1 g of sorbitan monostearate (Sorgen 50 manufactured by Daiichi Kogyo Seiyaku Co., Ltd.) as a surfactant under nitrogen and stirring the mixture at a high speed. The size of the average particle diameter of droplets of the aqueous initiator solution in the resulting suspension was about 5 to 6 μm. The suspension was introduced into the reaction vessel, and the suspension was stirred together with the pulp to react for 2 minutes. At this time, as a result of calculation, the volume ratio of the pulp to the droplets of the aqueous initiator solution was about 14:1, while the surface area ratio was about 1:1.

Then, the reaction vessel was set on a bath whose temperature was set to a constant temperature of 25° C. Next, 10 of acrylic acid as a monomer and 0.01 g of methylenebisacrylamide as a cross-linking agent were introduced into the reaction vessel, and graft polymerization was carried out for 5 hours. After the reaction, the sample was washed with distilled water and was then dried.

Since the weight of the sample was found to be about 6.7 g, the weight increase indicated that the grafting ratio was 34%. The polymer grafted onto the pulp were dyed with a basic dye, and the state of the polymers was observed under an optical microscope. The observation confirmed a non-uniform texture as in Example 6, thus indicating the presence of non-grafted regions. The grafted regions accounted for about 70 to 80% of the surface area. Further, it was confirmed that a large number of non-grafted domains having diameters of several μm were present.

In order to evaluate the performance of the sample as water-absorbing fibers, the sample was reacted with an aqueous solution of sodium hydroxide, and thereafter was washed and dried so that the grafted polyacrylic acid portions were converted into sodium salts thereof.

The water-absorbing ability was evaluated according to a commonly employed method wherein the water-absorbing ability was calculated as the difference between the weight of a sample saturated with pure water and the dry weight of the sample before water absorption. According to the evaluation, 1.0 g of the sample absorbed about 18 g of pure water, and therefore the sample had an excellent water-absorbing ability indicated by 18 g/g.

(Evaluation of Biodegradability)

The biodegradability of the sample was evaluated according to the same method as in Example 6. 1.0 g of the sample was found to have a weight of 0.3 g after the reaction with the enzyme, and therefore the sample exhibited an excellent enzymolysis ratio indicated by 70%. This result confirmed that the sample of this example had an excellent biodegradability comparable to the biodegradability of the natural material, despite the fact that the sample of this example was a composite material.

Comparative Example 4

5.0 g of the same pulp as in Example 6 was added to 90 ml of distilled water, and the fibers were dispersed by using a homogenizer. The dispersion thus obtained was placed in a reaction vessel, and the atmosphere inside the reaction vessel was replaced with nitrogen as an inert gas.

Then, the reaction vessel was set on a bath whose temperature was set to a constant temperature of 25° C. Next, 10 g of acrylic acid as a monomer and 0.01 g of methylenebisacrylamide as a cross-linking agent were introduced into the reaction vessel. Further, an aqueous solution, which was prepared by mixing 0.182 g of ammonium cerium(IV) nitrate as an initiator, 0.8 ml of 2N nitric acid aqueous solution and 5 ml of distilled water, was introduced into the reaction vessel, and graft polymerization was carried out for 5 hours. After the reaction, the sample was washed with distilled water and was then dried.

The grafting ratio of the sample obtained was 38%. The polymers grafted onto the pulp were dyed with a basic dye, and the state of the polymers was observed under an optical microscope. According to the observation, the surface was uniformly dyed, thereby indicating that polyacrylic acid was grafted uniformly to the surface of the pulp.

In order to evaluate the performance of the sample as water-absorbing fibers, the sample was reacted with an aqueous solution of sodium hydroxide as in Example 6 so as to convert into sodium salts. The water-absorbing ability was evaluated as in Example 6. According to the evaluation, 1.0 g of the sample absorbed about 19 g of pure water, and therefore the sample had an excellent water-absorbing ability indicated by 19 g/g which was equivalent to that of Example 6.

(Evaluation of Biodegradability)

The biodegradability of the sample of Comparative Example 4 was evaluated according to the same method as in Example 6. 1.0 g of the sample was found to have a weight of 0.8 g after the reaction with the enzyme, and therefore the sample exhibited an enzymolysis ratio indicated by 12%, which was lower than the ratios of Examples 1 and 2. This result confirmed that, if a synthetic polymer was grafted uniformly onto the surface of the pulp, the biodegradability of the natural material markedly decreased.

Example 8

5.0 g of cellulose particles (P-Cellulose manufactured by Wako Pure Chemical Industries, Ltd., having an average particle diameter of about 50 μm) was added to 25 ml of toluene, and the fibers were dispersed by stirring. The dispersion thus obtained was placed in a reaction vessel, and the atmosphere inside the reaction vessel was replaced with nitrogen as an inert gas.

A suspension of an initiator solution was prepared by a process of mixing 0.067 g of ammonium cerium(IV) nitrate as an initiator and 0.1 ml of 4N nitric acid aqueous solution (total volume of about 0.16 ml as an initiator solution) with 5 ml of a toluene solution containing 0.02 g of sorbitan monostearate (Sorgen 50 manufactured by Daiichi Kogyo Seiyaku Co., Ltd.) as a surfactant under nitrogen and stirring the mixture at a high speed. The size of the average particle diameter of droplets of the aqueous initiator solution in the resulting suspension was about 10 μm. The suspension was introduced into the reaction vessel, and the suspension was stirred together with the pulp to react for 2 minutes. At this time, as a result of calculation, the volume ratio of the pulp to the droplets of the aqueous initiator solution was about 31:1, while the surface area ratio was about 6:5.

Then, the reaction vessel was set on a bath whose temperature was set to a constant temperature of 25° C. Next, a solution, which was prepared by dissolving 10 g of acrylamide-2-methyl-propanesulfonic acid as a monomer and 0.01 g of methylenebisacrylamide as a cross-linking agent in 25 ml of dimethylformamide, was introduced into the reaction vessel, and graft polymerization was carried out for 5 hours. After the polymerization reaction, the sample was washed with distilled water and was then dried. Since the weight of the sample was found to be about 7.5 g, the weight increase indicated that the grafting ratio was 50%. The polymers grafted onto the particles were dyed with a basic dye, and the state of the polymer was observed under an optical microscope. The observation confirmed a nonuniform texture composed of dyed domains and undyed domains, wherein the dyed domains were regions where acrylamide-2-methyl-propanesulfonic acid was grafted, while the undyed domains were non-grafted regions. It was confirmed that the grafted regions accounted for about 80 to 90% of the surface area. Further, it was confirmed that non-grafted domains having diameters ranging from 5 to 20 μm were present.

In order to evaluate the function of the composite particles thus obtained, the ability to adsorb metal ions, $Cr^{3+}$ and $Co^{2+}$, was evaluated. The composite particles proved to be usable as an adsorbing agent because the composite particles were found to have a very good adsorbing ability supported by the result that the adsorption of the metal ions was 30 to 40% with respect to the sulfonic acid groups present in the graft-polymerized acrylamide-2-methyl-propanesulfonic acid gel.

(Evaluation of Biodegradability)

The biodegradability was evaluated according to the enzymolysis of the sample. Conditions are given below. 1.0 g of sample (dry weight) was added to 100 ml of a phosphoric acid-buffered aqueous solution having pH adjusted to 6.0. Further, 200 mg of a cellulose-decomposing enzyme (Cellulaze manufacture by Wako Pure Chemical Industries, Ltd.) was added to the solution, and the reaction was carried out over 72 hours at 40° C. The biodegradability was evaluated according to the weight difference of the sample between before and after the reaction.

1.0 g of the sample was found to have a weight of 0.30 g after the reaction with the enzyme, and therefore the sample exhibited an excellent enzymolysis ratio indicated by 70%. Meanwhile, the enzymolysis ratio of the cellulose particles under the same condition was 86%, which confirmed that the sample of this example had an excellent biodegradability comparable to the biodegradability of the natural material, despite the fact that the sample of this example was a composite material.

The method for producing composite materials of the present invention has a high degree of freedom in controlling the graft polymerization and makes it possible to control at will a surface structure in particular composed of graft polymers on the surface of a substrate, for example, a high-order structure such as a sea/island structure composed of domains made up of an assembly of sites where the graft polymers are bonded, and non-grafted regions.

The method for producing composite materials of the present invention enables even a non-aqueous, polymerizable monomer, which cannot be polymerized by a conventional polymerization method in an aqueous solvent, to be easily graft-polymerized.

The method for producing composite materials of the present invention makes it possible to inhibit the growth of a homopolymer at the time of graft polymerization.

The method for graft polymerization of the present invention can be widely used in the surface modification of various polymeric materials and inorganic materials. For example, the method can be used in the production of toner for electrophotography, additives for ink, functional colorants, electronic materials, functional paper, medical materials, materials for immobilizing physiologically active substances such as enzyme, materials for immobilizing microorganisms, materials for culturing cells, materials for cleaning environments, coagulating agents, adsorbing agents, water-absorbing materials, biodegradable materials, and the like.

If the composite material of the present invention is a biologically degradable composite material, since the fine structure on the surface of the substrate composed of a biodegradable polymeric material is nonuniform so that the fine structure has nonbonded domains where polymeric compounds of a different kind are not bonded, an enzyme which takes part in a biodegradable reaction easily invades and contacts the surface of the substrate composed of a biodegradable polymeric material to promote the reaction so that an excellent biodegradability is exhibited. Therefore, the composite material can obtain excellent functions through the polymeric compounds of a different kind, while a high level of biodegradability of the composite material is maintained.

What is claimed is:

1. A composite material comprising a substrate having a three-dimensional structure and including a surface, said substrate comprising a polymeric material including a reductive group selected from the group consisting of hydroxyl, aldehyde and amino groups, or an inorganic compound, wherein the composite material is produced by treating at least substantially the entire surface with a solution containing a graft polymerization initiator that reacts with said surface to form polymerization initiating regions on said surface, wherein the polymerization initiating regions are randomly distributed over said surface of said substrate, with the graft polymerization initiator being adhered dropwisely and graft-polymerizing a polymerizable unsaturated compound to the polymerization initiating regions such that said substrate has, on and over at least substantially the entire surface of said substrate treated with the solution, regions where the polymerizable unsaturated compound is graft-bonded and regions where the polymerizable unsaturated compound is not graft-bonded.

2. A composite material according to claim 1, wherein at least a region of the surface of the substrate other than said regions where the polymerizable unsaturated compound is graft-bonded, is chemically bonded with a compound which is different from said compound formed by the graft-bonding of the polymerizable unsaturated compound.

3. A composite material according to claim 1, wherein said polymerizable unsaturated compound is selected from the group consisting of acrylic acid, an acrylate, and styrene.

4. A composite material according to claim 1, wherein said substrate is a polysaccharide-based compound.

5. A composite material according to claim 1, wherein said substrate is a biodegradable material, and the compound formed by the graft-bonding of said polymerizable unsaturated compound is a compound different from said substrate.

6. A composite material according to claim 1, wherein said region where said polymerizable unsaturated compound is not graft-bonded has a size sufficient to define a circular region having a diameter of at least 5 nm.

7. A composite material according to claim 1, wherein the substrate further comprises regions where at least one graft polymer, which is different from the polymerizable unsaturated compound, is formed.

8. The composite material of claim 1, wherein the substrate is a block and the entire surface of the block has regions where the polymerizable unsaturated compound is graft-bonded.

9. The composite material of claim 1, wherein the substrate is a film and the entire surface of the film has regions where the polymerizable unsaturated compound is graft-bonded.

10. The composite material of claim 1, wherein the substrate is a particle and the entire surface of the particle has regions where the polymerizable unsaturated compound is graft-bonded.

11. The composite material of claim 1, wherein the substrate is a microcapsule and the entire surface of the microcapsule has regions where the polymerizable unsaturated compound is graft-bonded.

12. The composite material of claim 1, wherein the substrate comprises an aldehyde or an amino group.

13. The composite material of claim 1, wherein the substrate comprises an inorganic compound.

14. The composite material of claim 1, wherein the substrate comprises a laminated body.

15. The composite material of claim 1, wherein the substrate comprises a blend of a resin and the polymeric material having a reductive group.

16. The composite material of claim 1, wherein the polymerizable unsaturated compound is graft-bonded uniformly on the entire surface of the substrate.

17. A method for producing a composite material according to claim 1, comprising:

treating at least substantially the entire surface of the substrate with droplets of a solution containing the graft polymerization initiator in a suspension or an emulsion, which comprises the solution containing the graft polymerization initiator and a solvent immiscible in the solution, such that the droplets of the solution react with the surface of the substrate as a target of graft polymerization so as to form polymerization initiating regions on the surface of the substrate, wherein the polymerization initiating regions are randomly distributed over said surface of said substrate, with the graft polymerization initiator being adhered dropwisely; and then graft-polymerizing a polymerizable unsaturated compound to the polymerization initiating regions formed on the surface of said substrate;

wherein the substrate has, on and over at least substantially the entire surface of the substrate, regions where the polymerizable unsaturated compound is graft-bonded and regions where the polymerizable unsaturated compound is not graft-bonded.

18. A method for producing a composite material according to claim 17, wherein the polymerizable unsaturated compound is selected from the group consisting of acrylic acid, an acrylate and styrene.

19. A method for producing a composite material according to claim 17, wherein the substrate is a polysaccharide-based compound.

20. A method for producing a composite material according to claim 17, wherein the solution containing the graft polymerization initiator is an aqueous solution and the solvent is an organic solvent.

21. A method for producing a composite material according to claim 20, wherein the graft polymerization initiator is a water-soluble, redox radical polymerization initiator.

22. A method of producing a composite material according to claim 20, wherein the volume ratio of the substrate as a target of graft polymerization to the solution containing the graft polymerization initiator is in the range of from 1:1 to 10,000:1.

23. A method for producing a composite material according to claim 20, wherein the reaction between the droplets of the solution and the surface of a substrate takes place substantially on the entire surface of the substrate.

24. A method for producing a composite material according to claim 20, wherein the reaction between the droplets of the solution and the surface of the substrate takes place on a portion of the surface of the substrate to form the polymerization initiating sites on the portion of the surface so that the polymerizable unsaturated compound is graft-polymerized only to the portion of the surface where the polymerization initiating sites are formed.

25. A method for producing a composite material according to claim 1, comprising:

a first graft polymerization comprising treating at least substantially the entire surface of the substrate with droplets of a solution containing the graft polymerization initiator in a suspension or an emulsion, which comprises the solution containing the graft polymerization initiator and a solvent immiscible in the solution, such that the droplets of the solution react with the surface of the substrate as a target of graft polymerization so as to form polymerization initiating regions on the surface of the substrate, wherein the polymerization initiating regions are randomly distributed over said surface of said substrate, with the graft polymerization initiator being adhered dropwisely and then graft-polymerizing a first polymerizable unsaturated compound to the polymerization initiating regions formed on the surface of the substrate; and a second graft polymerization comprising graft-polymerizing a second polymerizable unsaturated compound, which is different from the first polymerizable unsaturated compound, to the surface where the first graft polymerization of the substrate does not take place;

wherein the substrate has, on and over at least substantially the entire surface of the substrate, regions where the first polymerizable unsaturated compound or the second polymerizable unsaturated compound are graft-bonded and regions where the first polymerizable unsaturated compound or the second polymerizable unsaturated compound are not graft-bonded.

26. A method for producing a composite material according to claim 25, wherein the second graft polymerization comprises:

reacting droplets of a solution containing a graft polymerization initiator in a suspension or an emulsion, which comprises a solution containing a graft polymerization initiator and a solvent immiscible in the solution containing the graft polymerization initiator, with the surface where the first graft polymerization of the substrate does not take place, so as to form the second polymerization initiating regions on the surface of the substrate; and then graft-polymerizing the second polymerizable unsaturated compound to the second polymerization initiating regions.

27. A method for producing a composite material according to claim 25, wherein the volume ratio of the substrate as a target of graft polymerization to the solution containing a graft polymerization initiator is in the range of from 1:1 to 10,000:1 in the first or the second graft polymerization.

28. A method for producing a composite material according to claim 25, wherein the polymerizable unsaturated compound is selected from the group consisting of acrylic acid, an acrylate and styrene in the first or second graft polymerization.

29. A method for producing a composite material according to claim 25, wherein the substrate is a polysaccharide-based compound.

30. A method for producing a composite material according to claim 25, wherein the graft polymerization initiator is a water-soluble, redox radical polymerization initiator.

31. A composite material according to claim 1, wherein the size of each region where the polymerizable unsaturated compound is graft bonded is in the range of from 1 nm to 1 mm.

32. A composite material according to claim 1, wherein the regions where the polymerizable unsaturated compound is graft-bonded have a sea/island structure.

33. A method for producing a composite material, said method comprising sequentially the step of reacting droplets of a solution containing a graft polymerization initiator in a suspension or an emulsion, which comprises the solution containing a graft polymerization initiator and a solvent immiscible with the solution containing the graft polymerization initiator, with the surface of a substrate as a target of graft polymerization so as to form polymerization initiating regions on the surface of the substrate, wherein the polymerization initiating regions are randomly distributed over said surface of said substrate, with the graft polymerization initiator being adhered dropwisely and the step of graft-polymerizing a polymerizable unsaturated compound to the polymerization initiating regions formed on the surface of said substrate.

34. A method for producing a composite material according to claim 33, wherein said solution containing a graft polymerization initiator is an aqueous solution and the solvent is an organic solvent.

35. A method for producing a composite material according to claim 34, wherein said reaction between the droplets of said aqueous solution and the surface of a substrate takes place on the entire surface of said substrate.

36. A method for producing a composite material according to claim 34, wherein said reaction between the droplets of the aqueous solution and the surface of a substrate takes place partly on the surface of said substrate to form polymerization initiating sites partly on the surface so that the polymerizable unsaturated compound is graft-polymerized only to the surface part where polymerization initiating sites of said substrate are formed.

37. A method for producing a composite material according to claim 34, wherein the volume ratio of said substrate as a target of graft polymerization to said solution containing a graft polymerization initiator is in the range of from 1:1 to 10000:1.

38. A method for producing a composite material according to claim 34, wherein said graft polymerization initiator is a water-soluble, redox radical polymerization initiator.

39. A method for producing a composite material according to claim 33, wherein said polymerizable unsaturated compound is selected from the group consisting of acrylic acid, an acrylate, and styrene.

40. A method for producing a composite material according to claim 33, wherein said substrate is a polysaccharide-based compound.

41. A method for producing a composite material, said method comprising a first graft polymerization step comprising reacting droplets of a solution containing a graft polymerization initiator in a suspension or an emulsion, which comprises said solution containing a graft polymerization initiator and a solvent immiscible with said solution containing said graft polymerization initiator, with the surface of a substrate as a target of graft polymerization so as to form polymerization initiating regions on the surface of said substrate, wherein the polymerization initiating regions are randomly distributed over said surface of said substrate, with the graft polymerization initiator being adhered dropwisely and then graft-polymerizing a first polymerizable unsaturated compound to the polymerization initiating regions formed on the surface of said substrate and a second graft polymerization step comprising graft-polymerizing a second polymerizable unsaturated compound, which is different from said first polymerizable unsaturated compound to said surface where said fist graft polymerization of said substrate does not take place.

42. A method for producing a composite material according to claim 41, wherein said second graft polymerization step comprises reacting droplets of a solution containing a graft polymerization initiator in a suspension or an emulsion, which comprises a solution containing a graft polymerization initiator and a solvent immiscible with said solution containing the graft polymerization initiator, with the surface where said first graft polymerization of said substrate does not take place, so as to form said second polymerization initiating regions on the surface of said substrate, and then graft-polymerizing said second polymerizable unsaturated compound to said second polymerization initiating regions.

43. A method for producing a composite material according to claim 41, wherein the volume ratio of said substrate as a target of graft polymerization to the solution containing a graft polymerization initiator is in the range of from 1:1 to 10000:1 in said first or second graft polymerization step.

44. A method for producing a composite material according to claim 41, wherein said polymerizable unsaturated compound is selected from the group consisting of acrylic acid, an acrylate, and styrene.

45. A method for producing a composite material according to claim 41, wherein said substrate is a polysaccharide-based compound.

46. A method for producing a composite material according to claim 41, wherein said graft polymerization initiator is a water-soluble, redox radical polymerization initiator.

47. A composite material comprising a substrate having a three-dimensional structure and including a surface, the substrate comprising a polymeric material including a reductive group selected from the group consisting of hydroxyl, aldehyde and amino groups, or an inorganic compound, said substrate having on and over substantially the entire surface, regions where a polymerizable unsaturated compound is graft-bonded and regions where the polymerizable unsaturated compound is not graft-bonded, wherein the regions where the polymerizable unsaturated compound is graft bonded comprise convex portions having a height in the range of from 1 nm to 10 $\mu$m.

48. A composite material comprising a substrate having a three-dimensional structure and including a surface, wherein the composite material is produced by treating the entire surface with a solution containing a graft polymerization initiator that reacts with the surface to form polymerization initiating regions on the surface, wherein the polymerization initiating regions are randomly distributed over said surface of said substrate, with the graft polymerization initiator being adhered dropwisely and graft-polymerizing a polymerizable unsaturated compound to the polymerization initiating regions such that the substrate has, on and over the entire surface of the substrate, regions where the polymerizable unsaturated compound is graft-bonded and regions where the polymerizable unsaturated compound is not graft-bonded, and at least a region of the surface of the substrate other than the regions where the polymerizable unsaturated compound is graft-bonded is chemically bonded with a compound that is different from the compound formed by the graft-bonding of the polymerizable unsaturated compound.

49. The composite material of claim 48, wherein the regions where the polymerizable unsaturated compound is graft bonded comprise convex portions having a height in the range of from 1 nm to 10 $\mu$m.

50. The composite material of claim 48, wherein the substrate is a particle and the entire surface of the particle has regions where the polymerizable unsaturated compound is graft-bonded.

51. The composite material of claim 48, wherein the substrate is a microcapsule and the entire surface of the microcapsule has regions where the polymerizable unsaturated compound is graft-bonded.

52. The composite material of claim 48, wherein the substrate comprises a polymeric material including a reductive group.

53. The composite material of claim 48, wherein the substrate comprises an inorganic compound.

54. The composite material of claim 48, wherein the substrate comprises a laminated body.

55. The composite material of claim 48, wherein the substrate comprises a blend of a resin and a polymeric material having a reductive group.

56. The composite material of claim 48, wherein the polymerizable unsaturated compound is graft-bonded uniformly on the entire surface of the substrate.

57. The composite material of claim 48, wherein the substrate comprises a polysaccharide-based compound.

58. A composite material comprising a substrate having a three-dimensional structure and including a surface, wherein the composite material is produced by treating the entire surface with a solution containing a graft polymerization initiator that reacts with the surface to form polymerization initiating regions on the surface, wherein the polymerization initiating regions are randomly distributed over said surface of said substrate, with the graft polymerization initiator being adhered dropwisely and graft-polymerizing a polymerizable unsaturated compound to the polymerization initiating regions such that the substrate has, on and over the entire surface of the substrate, regions where the polymerizable unsaturated compound is graft-bonded and regions where the polymerizable unsaturated compound is not graft-bonded, and the polymerizable unsaturated compound is selected from the group consisting of acrylic acid, an acrylate and styrene.

59. The composite material of claim 58, wherein the regions where the polymerizable unsaturated compound is graft bonded comprise convex portions having a height in the range of from 1 nm to 10 µm.

60. The composite material of claim 58, wherein the substrate is a particle and the entire surface of the particle has regions where the polymerizable unsaturated compound is graft-bonded.

61. The composite material of claim 58, wherein the substrate is a microcapsule and the entire surface of the microcapsule has regions where the polymerizable unsaturated compound is graft-bonded.

62. The composite material of claim 58, wherein the substrate comprises a polymeric material including a reductive group.

63. The composite material of claim 58, wherein the substrate comprises an inorganic compound.

64. The composite material of claim 58, wherein the substrate comprises a laminated body.

65. The composite material of claim 58, wherein the substrate comprises a blend of a resin and the polymeric material having a reductive group.

66. The composite material of claim 58, wherein the polymerizable unsaturated compound is graft-bonded uniformly on the entire surface of the substrate.

67. The composite material of claim 58, wherein the substrate comprises a polysaccharide-based compound.

* * * * *